(12) United States Patent
Blumberg

(10) Patent No.: US 6,260,758 B1
(45) Date of Patent: Jul. 17, 2001

(54) PROMOTIONAL FINANCIAL TRANSACTION MACHINE METHOD

(75) Inventor: Barry B. Blumberg, Yardley, PA (US)

(73) Assignee: Compuscan Technologies Inc., DeLean, NJ (US)

( * ) Notice: Subject to any disclaimer, the term of this patent is extended or adjusted under 35 U.S.C. 154(b) by 0 days.

(21) Appl. No.: 09/047,220

(22) Filed: Mar. 25, 1998

(51) Int. Cl.[7] .................................................. G06F 17/60
(52) U.S. Cl. ............................................ 235/379; 235/380
(58) Field of Search .................................. 235/380, 379, 235/492, 383, 378

(56) References Cited

U.S. PATENT DOCUMENTS

| | | | |
|---|---|---|---|
| 4,669,730 | 6/1987 | Small | 273/138 |
| 4,815,741 | 3/1989 | Small | 273/138 |
| 4,993,714 | 2/1991 | Golightly | 273/138 A |
| 5,025,139 | 6/1991 | Halliburton, Jr. | 235/379 |
| 5,457,305 * | 10/1995 | Akel et al. | 235/379 |
| 5,481,094 | 1/1996 | Suda | 235/383 |
| 5,530,232 * | 6/1996 | Taylor | 235/380 |
| 5,531,482 * | 7/1996 | Blank | 283/67 |
| 5,578,808 * | 11/1996 | Taylor | 235/380 |
| 5,619,558 | 4/1997 | Jheeta | 379/90 |
| 5,649,118 * | 7/1997 | Carlisle et al. | 395/241 |
| 5,696,908 | 12/1997 | Muehlberger et al. | 395/239 |
| 5,806,045 * | 9/1998 | Biorge et al. | 705/14 |
| 5,832,457 | 11/1998 | O'Brien et al. | 705/14 |
| 5,854,581 * | 12/1998 | Mori et al. | 235/379 |
| 5,857,175 * | 1/1999 | Day et al. | 705/14 |
| 5,898,155 * | 4/1999 | Imai et al. | 235/379 |

FOREIGN PATENT DOCUMENTS

| | | |
|---|---|---|
| 0 627 714 A2 | 12/1994 | (EP) . |
| 0 627 714 A3 | 10/1998 | (EP) . |
| 2 306 740 | 5/1997 | (GB) . |
| WO 96/41289 | 12/1996 | (WO) . |
| WO 97/46961 | 12/1997 | (WO) . |

OTHER PUBLICATIONS

PCT International Search Report mailed Jul. 22, 1999 in International Application No. PCT/US99/06354.

* cited by examiner

*Primary Examiner*—Karl D. Frech
(74) *Attorney, Agent, or Firm*—Morgan, Lewis & Bockius LLP

(57) ABSTRACT

An improved promotional financial transaction machine method which includes the steps of determining whether a patron's transaction at the financial transaction machine qualifies for a promotional offer; performing transaction-specific promotional processing if the patron's transaction qualifies for a promotional offer; selectively printing a promotional receipt from the financial transaction machine by a variable print-on-demand process if the patron's transaction qualifies for a promotional offer, wherein the promotional receipt includes a patron-interactive promotional section; and providing the promotional receipt to the patron.

17 Claims, 7 Drawing Sheets

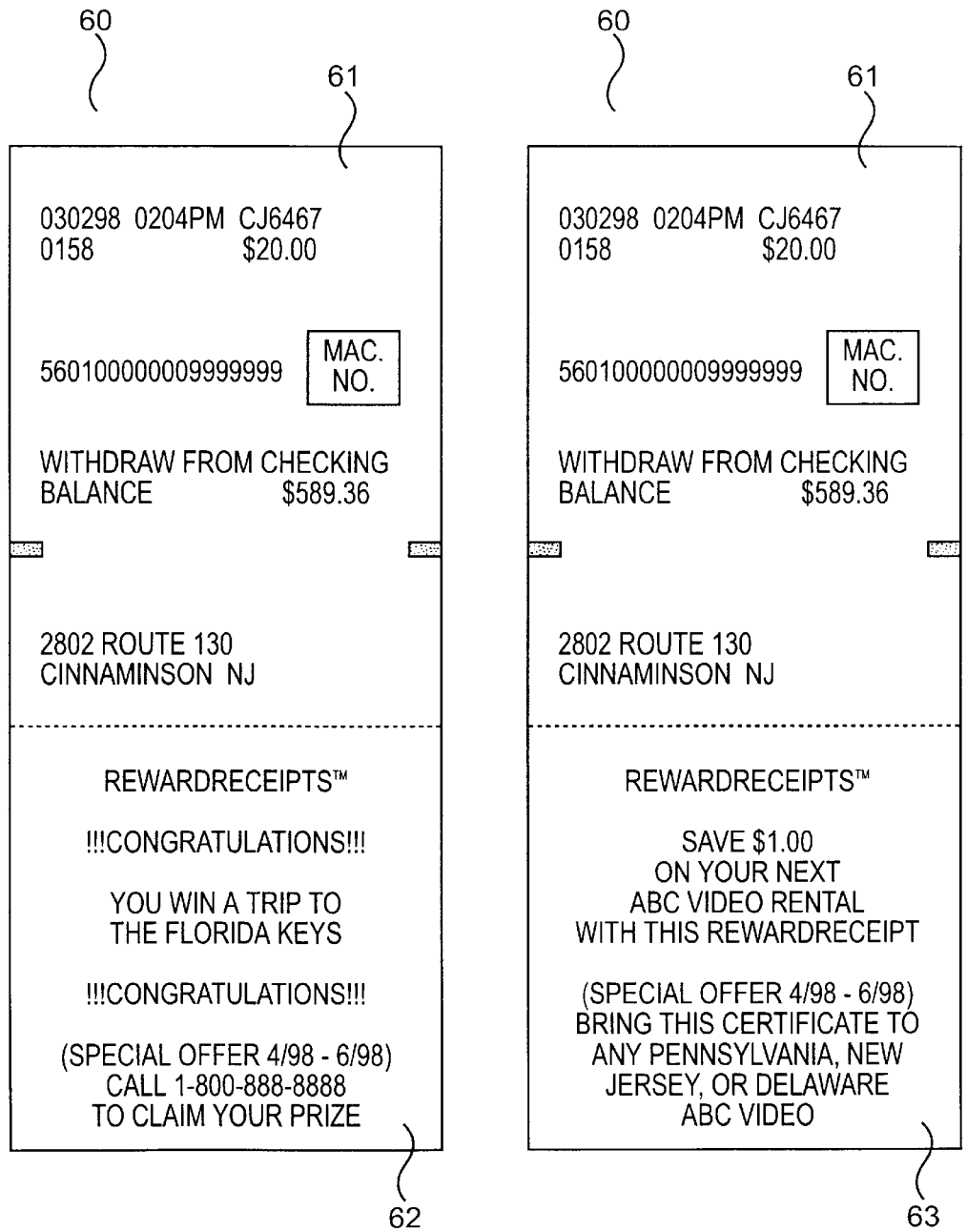
*FIG. 6A*     *FIG. 6B*

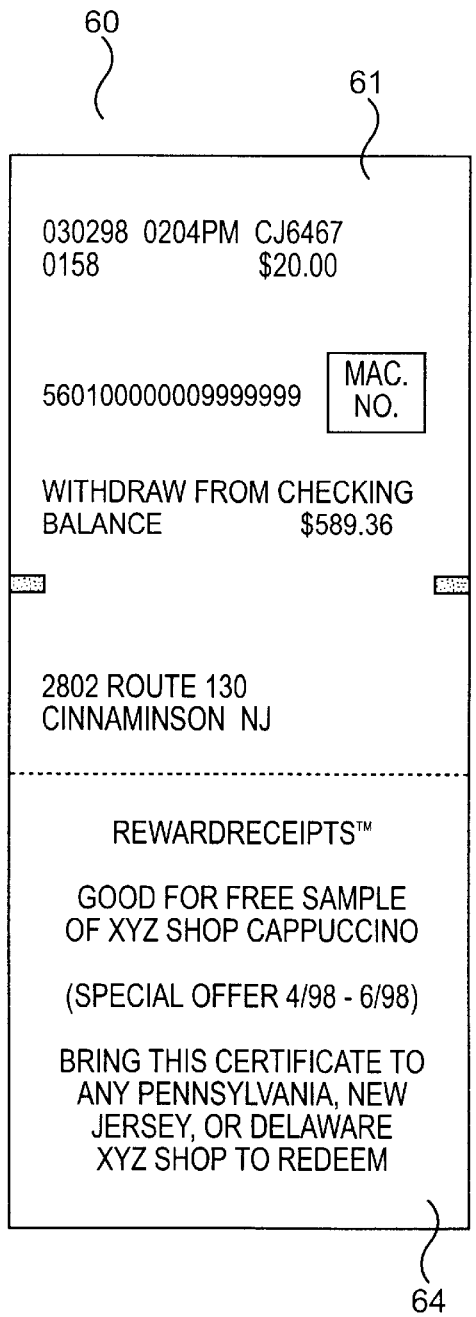
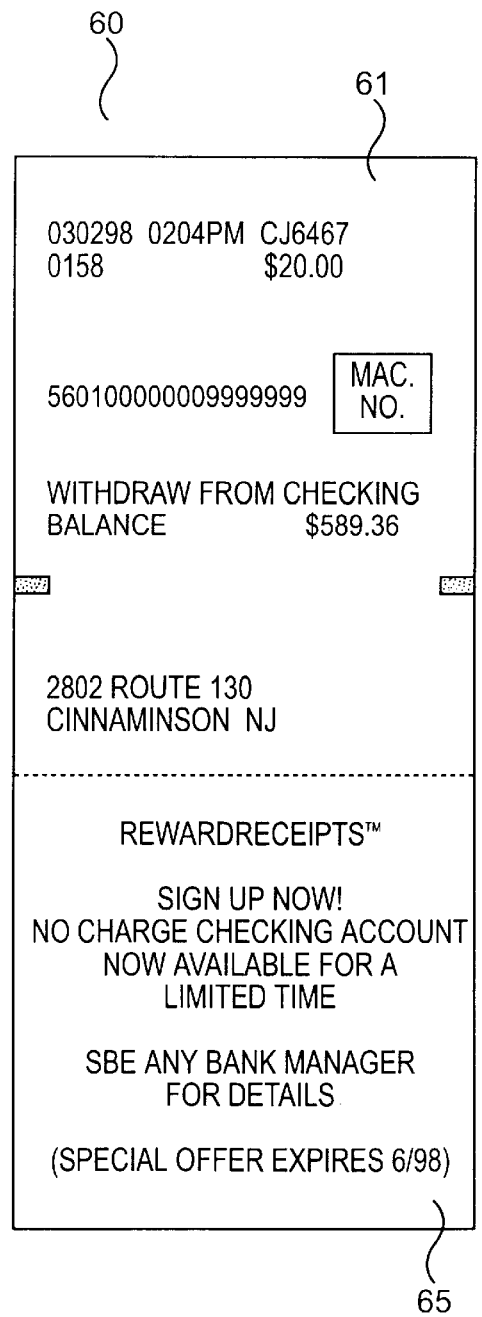
FIG. 6C  FIG. 6D

PROMOTIONAL FINANCIAL TRANSACTION MACHINE METHOD

BACKGROUND OF THE INVENTION

1. Field of the Invention

The present invention relates to promotional financial transaction machine methods wherein a patron's executed transaction at a financial transaction machine is evaluated to determine whether it qualifies to result in a promotional receipt being generated to the patron.

2. Discussion of the Related Art

FIG. 1 is a schematic block diagram of a conventional financial services distribution system utilizing a financial transaction machine ("FTM"). Common examples of financial transaction machines are automated teller machines ("ATM's") and point of sale terminals. FIG. 1 shows a plurality of FTM machines 10, each coupled to a central FTM host terminal driver system 20. The host terminal driver system 20 includes a terminal handler portion 21 for interfacing with the respective FTM machines as well a processor interface portion 22 for interfacing with electronic finds transfer authorizing network 30 (hereinafter EFT authorizing network). The EFT authorizing network 30 includes a network switch 31, an issuer host terminal 32 and an issuer data base 33. The host terminal driver system 20 is programmed to perform a number of financial services distribution functions such as analyzing and processing transaction requests input by a patron at one of the financial transaction machines 10. The host terminal driver system 20 stores information about these transaction requests locally and generates further requests which are communicated with, for example, the patron's bank through the network switch 31. Such a financial services distribution system can be used for standard ATM network functions such as withdrawal, deposit, and inquiry of account funds. This distribution system can also be used for point-of-sale transaction handling.

The use of such financial transaction machines has increased dramatically over the last decade. Patrons enjoy the 24-hour, seven days a week convenience of such machines. Despite the immense popularity and widespread use of such machines, there has been little if any interactive targeted promotional activity developed by financial service providers and/or merchants to entice patrons to perform particular transaction types at these machines. Such interactive targeted promotions for financial transaction machines can increase transaction volume for a given machine, add consumer value to offset a surcharge fee, strengthen a business partnership between a service provider and a merchant, and also create consumer and merchant excitement.

The distribution arrangement described by the foregoing discussion is a mature system and supports well defined processing and performance standards. Any attempt to add interactive targeted promotion components within this existing transaction processing flow would require re-certification of EFT network participation. As a result, network deployer's and financial service providers are reluctant to disturb this processing under any circumstances. Moreover, organizations that deploy such financial transaction machine arrangements have limited resources to devote to non-core application development. As a result, these organizations are reluctant to commit their qualified technical personnel experienced in EFT systems to non-core, non-priority projects.

SUMMARY OF THE INVENTION

Accordingly, the present invention is directed to an improved promotional financial transaction machine method that substantially obviates any problems due to limitations and disadvantages of the related art.

An object of the present invention is the provision of a promotional financial transaction machine method which occurs outside the existent EFT transaction processing flow.

Another object of the present invention is the provision of a promotional financial transaction machine method which results in an increased transaction volume.

Another object of the present invention is the provision of a promotional financial transaction machine method which adds consumer value to their financial transaction.

Another object of the present invention is the provision of a promotional financial transaction machine method which strengthens the partnership between a financial service provider and a merchant.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an improved promotional financial transaction machine method includes the steps of determining whether a patron's transaction at the financial transaction machine qualifies for a promotional offer; performing transaction-specific promotional processing if the patron's transaction qualifies for a promotional offer; selectively printing a promotional receipt from the financial transaction machine by a variable print-on-demand process if the patron's transaction qualifies for a promotional offer, wherein the promotional receipt includes a patron-interactive promotional section; and providing the promotional receipt to the patron.

In another aspect of the instant invention, an improved promotional financial transaction machine method includes the steps of coupling a promotion controller processor between a financial transaction machine and a central financial transaction machine terminal driver host system; determining by qualification process software resident in said promotion controller processor whether a patron's transaction at the financial transaction machine qualifies for a promotional offer; obtaining a promotion result by performing transaction-specific promotional processing within the promotion controller processor if the patron's transaction qualifies for a promotional offer; obtaining a financial transaction result by passing financial transaction data from the patron's transaction through the central financial transaction machine host terminal driver system to an electronic funds transfer authorizing network for electronic fuinds transfer authorization and processing; returning the financial transaction result to the promotion controller processor from the electronic finds transfer authorizing network; formatting the promotion result and the financial transaction result within a terminal handler portion of the central financial transaction machine host terminal driver system and transferring the formatted result to the financial transaction machine for printing of a receipt within the financial transaction machine; and providing the printed receipt to the patron from the financial transaction machine by a variable print process including the promotion result if the patron's transaction qualified for a promotional offer.

In another aspect of the instant invention, an improved promotional financial transaction machine method includes the steps of coupling a plurality of financial transaction machines to a terminal handler portion of a central financial transaction machine terminal driver host system; coupling a promotion controller processor to the terminal handler portion of the central financial transaction machine host terminal driver system; determining by qualification process software resident in the promotion controller processor whether a patron's transaction at one of the plurality of financial transaction machines qualifies for a promotional offer; obtaining a promotion result by performing transaction-specific promotional processing within the promotion controller processor if the patron's transaction qualifies for a promotional offer; obtaining a financial transaction result by passing financial transaction data from the patron's transaction through the central financial transaction machine host terminal driver system to an electronic finds transfer authorizing network for electronic funds transfer authorization and processing; returning the financial transaction result to the promotion controller processor from the electronic funds transfer authorizing network; formatting the promotion result and the financial transaction result within the terminal handler portion of the central financial transaction machine host terminal driver system and transferring the formatted result to the one of said plurality of financial transaction machines for printing of a receipt within the one of said plurality of financial transaction machines; and providing the printed receipt to the patron from the one of said plurality of financial transaction machines by a variable print process including the promotion result if the patron's transaction qualified for a promotional offer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6, comprising FIGS. 6A to 6D, illustrates examples of promotional receipts according to the present invention.

DETAILED DESCRIPTION OF THE PREFERRED EMBODIMENTS

Reference will now be made in detail to the preferred embodiments of the present invention, examples of which are illustrated in the accompanying drawings. Corresponding elements will be labeled with the same numbers, and a redundant detailed description will be omitted.

Figure 1:
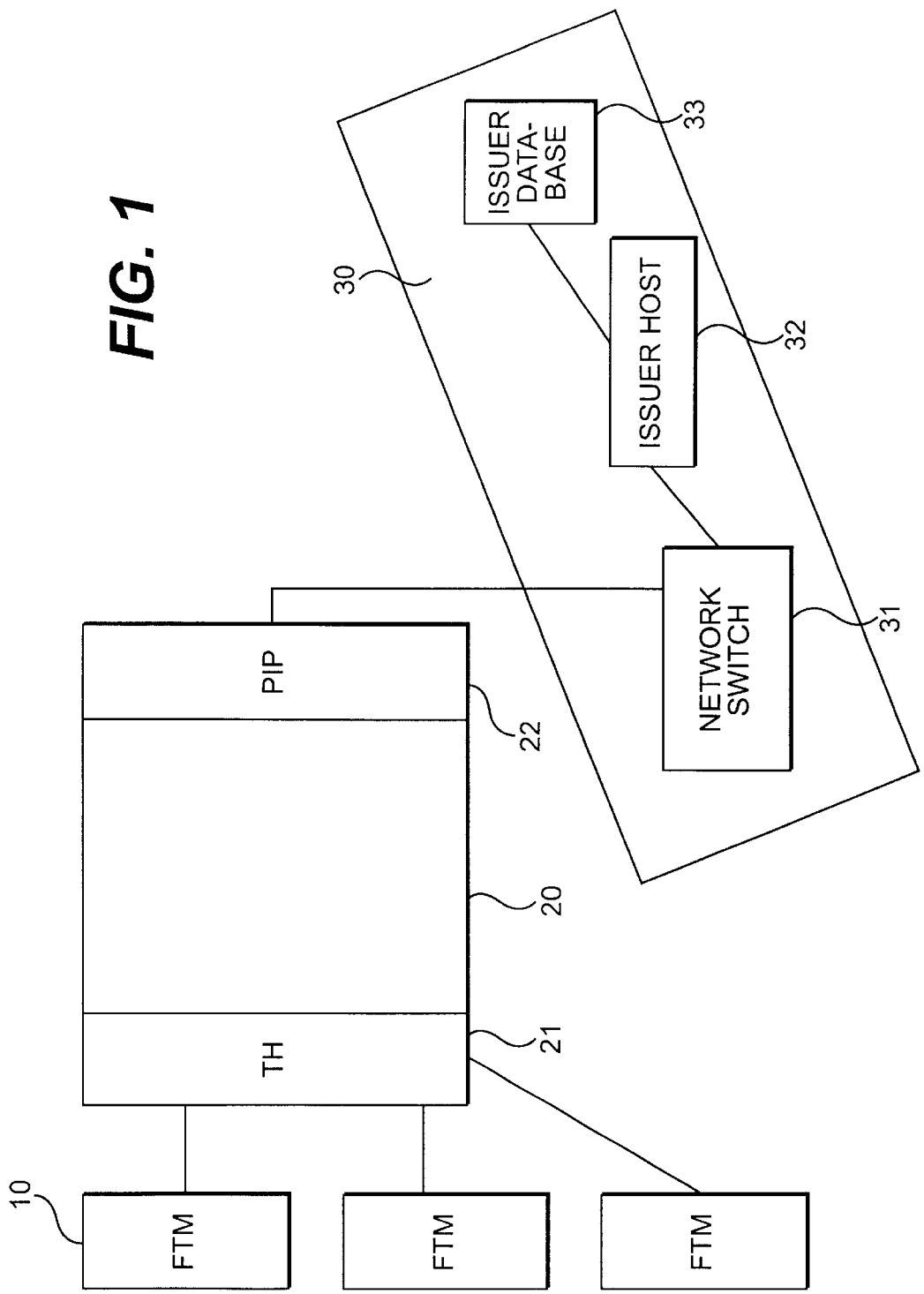
FIG. 1 is a schematic block diagram of a conventional financial services distribution system utilizing a financial transaction machine.
Figure 2:
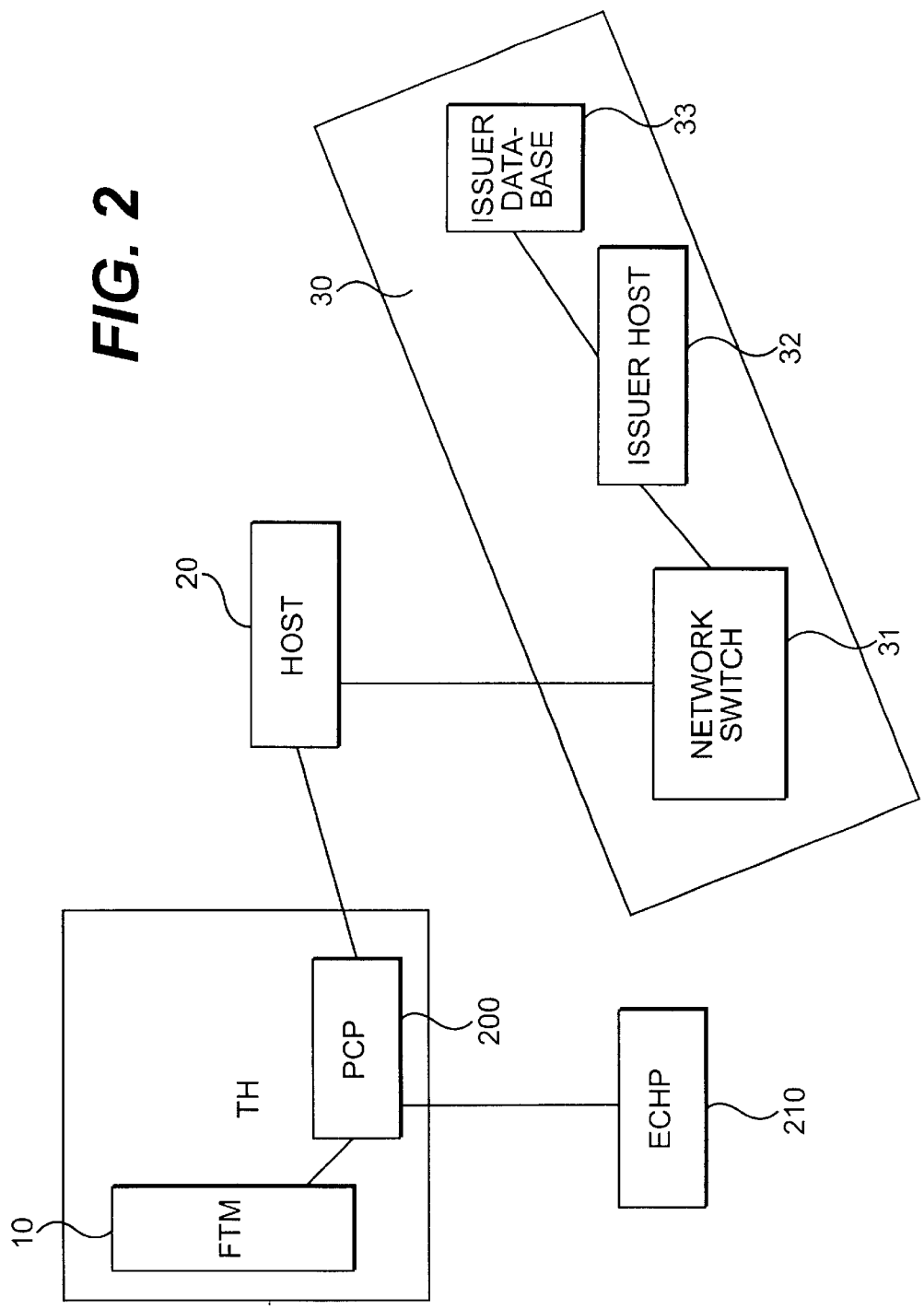
FIG. 2 is a schematic block diagram of a financial services distribution system utilizing a financial transaction machine in accordance with a first preferred embodiment of the instant invention.

FIG. 2 is a schematic block diagram of a financial services distribution system utilizing a financial transaction machine ("FTM") 10 in accordance with a first preferred embodiment of the instant invention. For example, this FTM may be an automated teller machine ("ATM") or a point of sale transaction machine. This arrangement includes a promotion controller processor 200 installed at the location of the FTM 10. For example, this promotion controller processor 200 may be installed within the FTM cabinet or enclosure and is physically attached to the FTM. The promotion controller processor 200 is coupled between the FTM and the central FTM host terminal driver system 20. The promotion controller processor 200 monitors all information traffic flowing out of the FTM and logically enters the transaction stream when it determines that certain predefined criteria, or transaction types, have been satisfied by the patron's particular activity at the FTM. These transaction types, which will be described later in more detail, include using the FTM at a predetermined time, using the FTM to purchase a particular product, and using the FTM to withdraw at least a predetermined minimum amount of money. If the patron satisfies one of these transaction types by it's transaction request then that transaction qualifies for a promotional offer and the promotion controller processor 200 performs transaction-specific promotional processing to generate a promotional receipt for the patron including a patron-interactive promotional section. The promotion controller processor 200 then directs the FTM to print the promotional receipt and provide it to the patron. More specifics of the promotional receipt will be described later.

The promotion controller processor 200 is a custom processor that monitors the entire outbound data stream of an individual FTM. This processor 200 may be a "PC on a card" or a custom designed processor that may be running UNIX, OS/2 or some other multi-tasking operating system. A variety of processing systems may be utilized, depending on the size of a particular application. Thus, scalable, high speed, redundant, fault-tolerant, on-line transaction processing is suggested.

A plurality of promotion controller processors 200, each at a different FTM, are updated regularly via batch communications by an event controller host processor 210. This event controller host processor 210 handles event management, promotional message contents and other variables. More specifically, the event controller host processor 210 collects and combines uploads from a plurality of individual FTMs on a regular basis. Also, the event controller 210 distributes software modifications via downloads to the FTMs on a regular basis. Other functions of the event controller host processor 210 include creating and maintaining promotions, controlling distribution of promotional messages, controlling the distribution of PINs, auditing daily activity at the individual financial transaction machines, initiating play reallocations, initiating suspend and resume scripts, preparing forecast and performance reports, and initiating the end of event clean up.

The functionality of the individual promotion controller processors 200 further includes running promotional programs and communications software, processing transactions from the FTM, processing uploads to and downloads from the event controller host processor 210 on a regular basis.

As is evident from FIG. 2, this arrangement requires little or no changes to the configuration of the central financial transaction machine host terminal driver system 20 and the EFT authorizing network 30, consistent with the objects of the invention set forth above.

Figure 3:
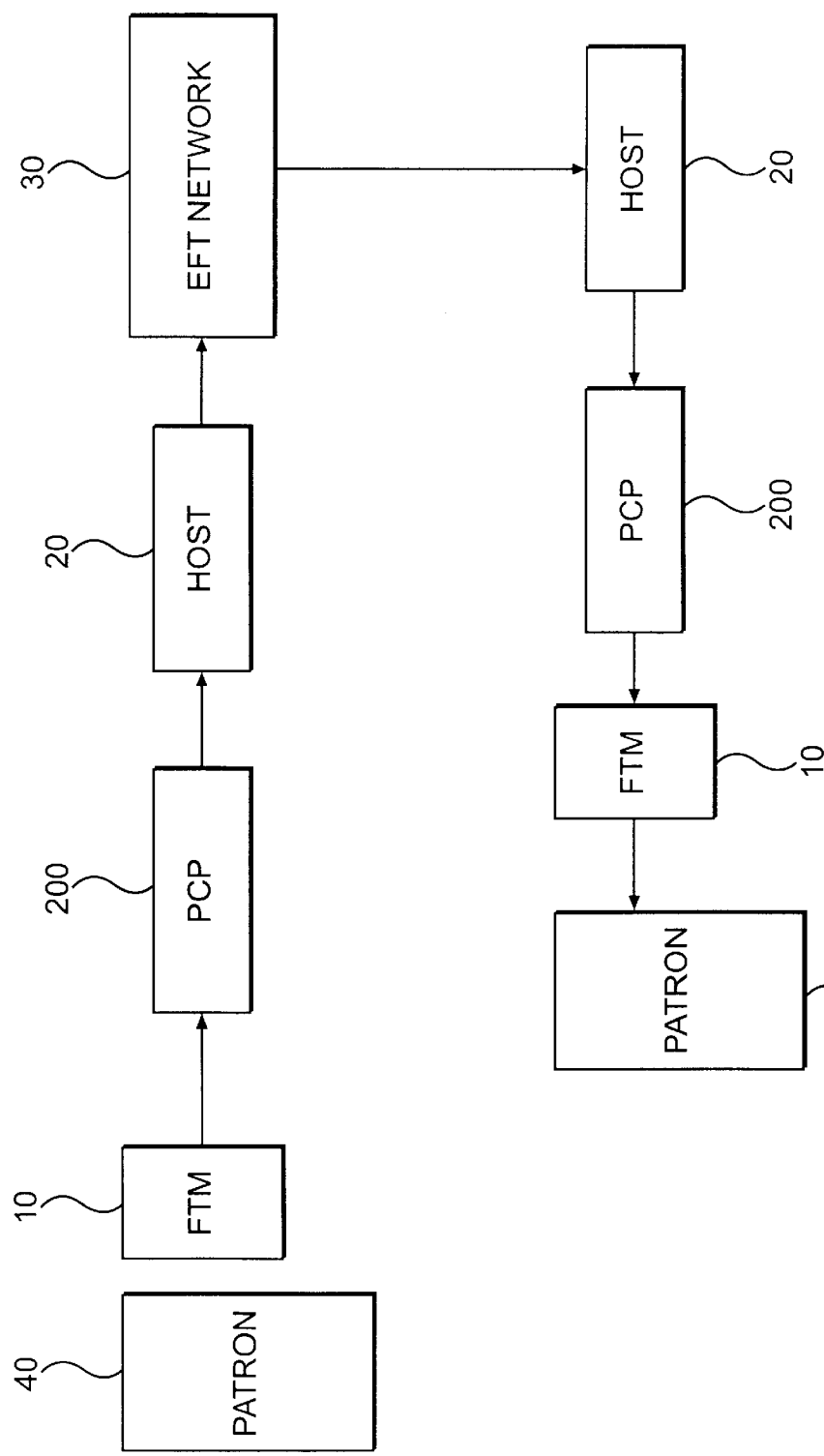
FIG. 3 is a transaction flow diagram of the financial services distribution system of FIG. 2 utilizing a financial transaction machine in accordance with the first preferred embodiment of the instant invention.

The operation of the financial services distribution system of FIG. 2 will now be described with reference to the transaction flow diagram of FIG. 3. As described above, this configuration utilizes a network of limited function intelligent boxes, also referred to as promotion controller processors 200. These processors 200 are PC-based and are installed at local FTM sites, for example, local ATM sites. A patron 40 initiates a transaction request at a financial transaction machine, for example at an ATM 10. This transaction is passed to a promotion controller processor 200, which strips off any required promotional transaction data and supplies it to qualification process software resident in the promotion controller processor 200 in order to determine whether it satisfies a predetermined transaction type and thus qualifies for a promotional offer.

Meanwhile, the financial transaction data from the FTM is passed by the promotion controller processor 200 to the central financial transaction machine host terminal driver system 20 so that EFT authorization and processing may proceed in the usual way by the EFT authorizing network 30. If the transaction data analyzed at the promotion controller processor 200 is qualified as satisfying a predetermined transaction type, transaction-specific processing is commenced and a result is determined by the promotion controller processor 200. Promotion software, promotion rules and award tables are maintained at the promotion controller processor 200. The promotion result is held at the promotion controller processor 200, awaiting receipt of the outcome of the financial transaction authorization request that has continued through the normal EFT transaction process. This financial transaction result is returned from the EFT authorizing network 30 to the terminal handler portion 21 of the central financial transaction machine host terminal driver system 20, which formats the promotion result and the financial transaction result and then transfers this formatted result to the financial transaction machine for receipt printing from the financial transaction machine.

The FTM receipt is formatted appropriately in a print buffer as a promotional receipt having a patron-interactive promotional section, including a promotional message and the promotion result, as well as the conventional financial regulation E information. This promotional receipt is then provided to the patron 40 by the FTM 10. If the promotion controller processor 200 did not identify a predetermined transaction type which qualifies for a promotional offer in the data input by the patron to the FTM, then a standard regulation E receipt including only financial transaction details will be printed by the FTM. Thus, the promotional receipt having a patron-interactive promotional section is printed by a variable print-on-demand process using standard FTM receipt paper. As a result, no special printing paper with, for example, preprinted coupons and the like need be used at the FTM's.

FIGS. 6A to 6D illustrate examples of promotional receipts 60 of the present invention. One embodiment of the promotional receipt includes both a patron-interactive promotional section (62–65) as well as a financial section 61, detailing the financial transaction, on the same receipt. Another embodiment prints the promotional receipt including only the patron-interactive promotional section as a separate receipt after the standard regulation E receipt detailing the financial transaction has been printed by the FTM.

As shown in FIGS. 6A to 6D, the patron-interactive promotional section of the promotional receipt can include any of a variety of rewards to the patron. For example, this section of the receipt can indicate to the patron whether they are an instant winner of a random prize selection process or sweepstakes actuated during the financial transaction. An example of this variety is illustrated in FIG. 6A, showing a promotional receipt 60 having a patron-interactive promotional section 62 informing a patron of their sweepstakes prize. The random prize selection processing takes place within the promotion controller processor 200. Another reward type for the patron-interactive promotional section comprises a value coupon distributed to the patron. An example of this variety is illustrated in FIG. 6B, showing a promotional receipt 60 having a patron-interactive promotional section 63 value coupon allowing the patron to save $1.00 on their next video rental from a particular video rental establishment. This value coupon, for example, could also be a cross traffic coupon to encourage business between two separate merchants. The promotional section of another embodiment includes a coupon allowing the patron to obtain a free sample of a product specified on the promotional section upon in-store redemption of the promotional section of the promotional receipt. An example of this variety is illustrated in FIG. 6C, showing a promotional receipt 60 having a patron-interactive promotional section 64 coupon allowing the patron to sample a free product from a particular establishment. The promotional section of another embodiment includes a targeted consumer message from a product or service company to the patron. An example of this variety is illustrated in FIG. 6D, showing a promotional receipt 60 having a patron-interactive promotional section 65 informing the patron of a special offer from a particular establishment. The promotional section of another embodiment is any of a variety of alternate media transaction products such as, for example, a prepaid phone card, postal stamps, or tickets for entertainment events. Finally, the promotional section of still another embodiment indicates loyalty points to a patron for a collect and redeem program.

As described above, transaction-specific promotional processing is performed by the promotion controller processor and a promotional receipt is issued by the FTM only when the patron's transaction at the FTM satisfies particular criteria thus qualifying it for a promotional offer which results from the transaction-specific promotional processing. Such particular criteria include, for example, the requirement that particular predetermined products be purchased by the patron, such as phone card purchases, postal stamp purchases, or entertainment event tickets at an ATM or other financial transaction machine. The phone card purchase requirement may include a predetermined number of call minutes. Similarly, the postal stamp purchase requirement may include a predetermined amount of postal stamps. Moreover, the products purchased need not be limited to phone card, postal stamp, and entertainment event ticket purchases, but rather can include purchases of any other such alternate media transaction products. As a result, the chance to win one of the customer rewards or enjoy any of the promotions detailed above entices patrons to purchase a particular product using a financial transaction machine.

Another criterion requires the use of the FTM by a patron at a particular time, such as a specific date or a specific time of day. As a result, the chance to win one of the customer rewards or enjoy any of the promotions detailed above entices patrons to conduct a financial transaction at a FTM at a particular time. Still another criterion requires the withdrawal of at least a predetermined amount of money using the FTM. As a result, the chance to win one of the customer rewards or enjoy any of the promotions detailed above entices patrons to withdraw at least a predetermined amount of money using a financial transaction machine. Finally, another criterion requires that the patron's transaction included the use of a card from a predetermined institution, such as a particular bank, for example.

Figure 4:
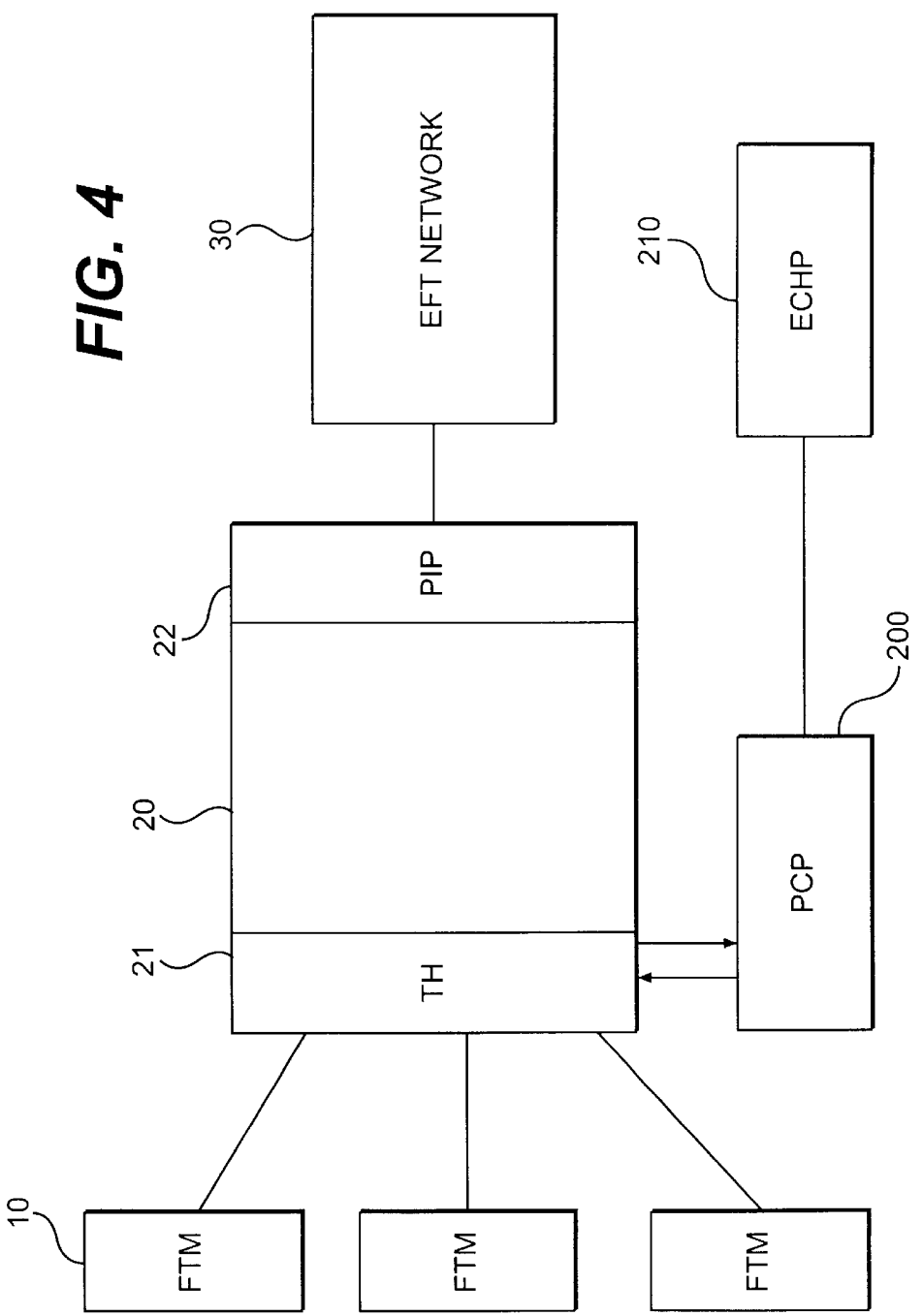
FIG. 4 is a schematic block diagram of a financial services distribution system utilizing a financial transaction machine in accordance with a second preferred embodiment of the instant invention.

FIG. 4 is a schematic block diagram of a financial services distribution system utilizing a financial transaction machine in accordance with a second preferred embodiment of the instant invention. This arrangement differs from the arrangement of the first preferred embodiment shown in FIG. 2 at least in its placement of the promotion controller processor 200 and the event controller host processor 210. In this arrangement the promotion controller processor 200 is coupled to the terminal handler portion 21 of the central financial transaction machine host terminal driver system 20, but not directly connected to an FTM as in the first preferred embodiment. The promotion controller processor 200 of one arrangement of the second preferred embodiment is resident within the terminal handler 21 software. The promotion controller processor 200 of another arrangement of the second preferred embodiment is directly connected to the terminal handler 21 software, but not resident within the terminal handler 21 software.

Like the first preferred embodiment arrangement, the promotion controller processor 200 is updated regularly by an event controller host processor 210. The promotion controller processor 200 and the event controller host processor 210 of this arrangement support multiple financial transaction machines. This second preferred embodiment arrangement results in a system that is centrally supported and administered, requiring no field level equipment deployment as is required in the first preferred embodiment arrangement.

Figure 5:
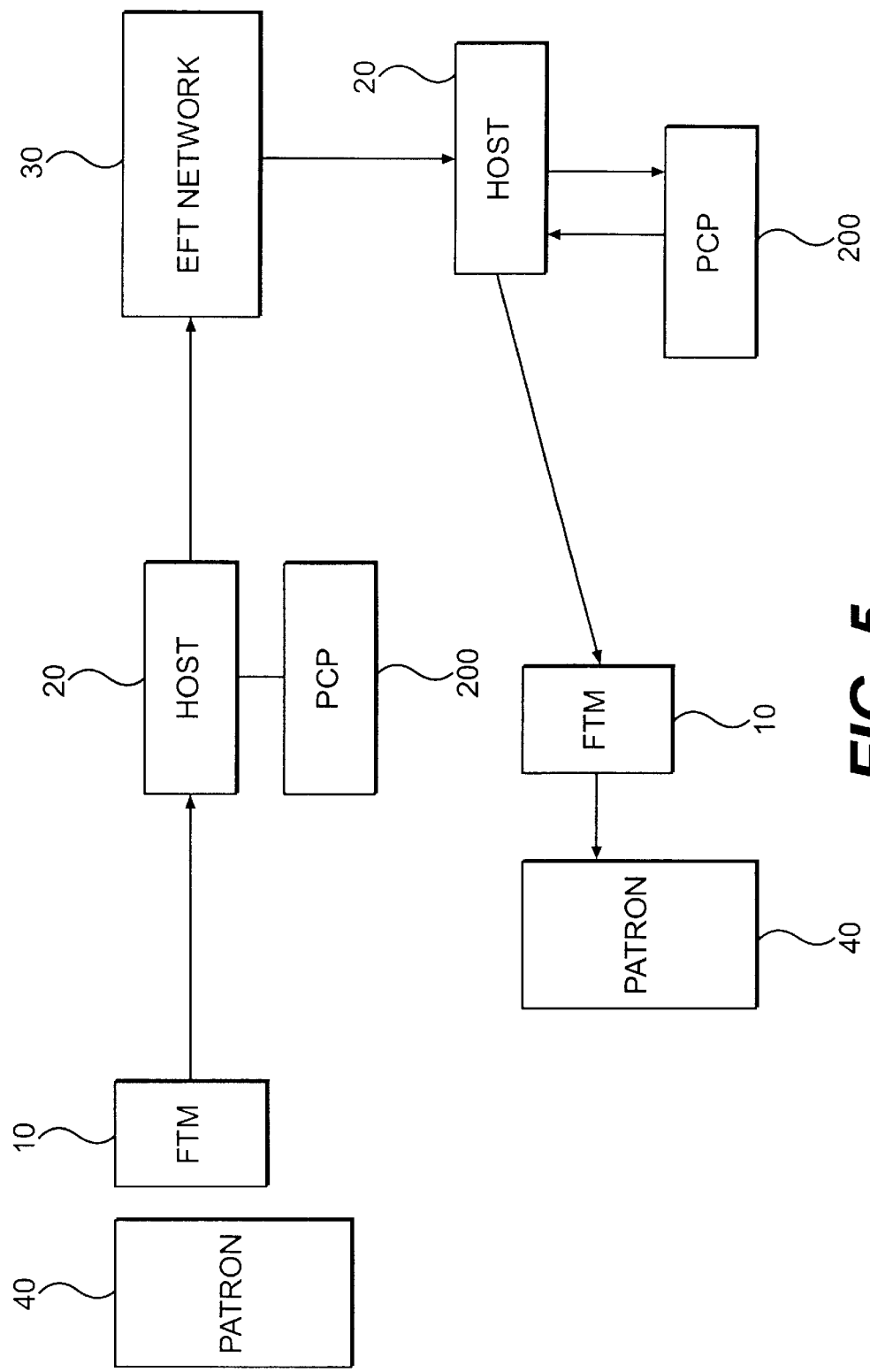
FIG. 5 is a transaction flow diagram of the financial services distribution system of FIG. 4 utilizing a financial transaction machine in accordance with the second preferred embodiment of the instant invention.

The operation of the financial services distribution system of FIG. 4 will now be described with reference to the transaction flow diagram of FIG. 5. A patron 40 initiates a transaction request at a financial transaction machine, for example at an ATM 10. This transaction request is forwarded to the central FTM host terminal driver system 20 as in conventional systems. The central FTM host terminal driver system 20 performs routine processing and routing and the financial transaction request of the patron is forwarded for normal processing in the EFT authorizing network 30 in accordance with established ATM transaction processing. The financial transaction is then returned to the central FTM host terminal driver system 20 and is forwarded by the terminal handler portion 21 of the host terminal driver system 20 to the promotion controller processor 200 for promotional processing. If a predetermined transaction type which qualifies for a promotional offer is determined to have been requested by the patron, the promotion controller processor 200 begins the promotional processing. The promotion result and the financial transaction result data are then formatted within the terminal handler portion 21 of the host terminal driver system 20. This formatted data is then provided to the FTM from the terminal handler portion 21 of the host terminal driver system 20 for receipt printing within the FTM 10.

The FTM receipt is formatted appropriately in a print buffer as a promotional receipt having a patron-interactive promotional section, including a promotional message and the promotional processing result, as well as the conventional financial regulation E information. This promotional receipt is then provided to the patron 40 by the FTM 10. If the promotion controller processor 200 did not identify a predetermined qualifying transaction type in the transaction data input by the patron to the FTM, then a standard regulation E receipt including only financial transaction details will be printed by the FTM. Thus, as in the first preferred embodiment, the promotional receipt having a patron-interactive promotional section is printed on demand by a variable print process using standard FTM receipt paper. As a result, no special printing paper with, for example, pre-printed coupons and the like need be used at the FTM's.

It will be apparent to those skilled in the art that various modifications and variations can be made in the improved promotional financial transaction machine method of the present invention without departing from the spirit or scope of the invention. Thus, it is intended that the present invention cover the modifications and variations of this invention provided they come within the scope of the appended claims and their equivalents.

What is claimed is:

1. An improved promotional financial transaction machine method comprising the steps of:

determining whether a patron's specific transaction type at the financial transaction machine qualifies for a promotional offer;

performing transaction-specific promotional processing if the patron's specific transaction type qualifies for a promotional offer;

selectively printing a promotional receipt on demand from the financial transaction machine by a variable print-on-demand process if the patron's specific transaction type qualifies for a promotional offer, wherein said promotional receipt includes a patron-interactive promotional section; and providing said promotional receipt to the patron;

wherein said variable print-on-demand process allows the use of standard FTM receipt paper for printing the promotional receipt within the FTM.

2. The improved promotional financial transaction machine method of claim 1, wherein said patron-interactive promotional section of the promotional receipt indicates to the patron whether they are an instant winner of a random prize selection process actuated during the financial transaction within the financial transaction machine.

3. The improved promotional financial transaction machine method of claim 1, wherein said patron-interactive promotional section of the promotional receipt comprises a value coupon distributed to the patron.

4. The improved promotional financial transaction machine method of claim 1, wherein said patron-interactive promotional section of the promotional receipt is an alternate media transaction product.

5. The improved promotional financial transaction machine method of claim 1, wherein said patron-interactive promotional section of the promotional receipt indicates loyalty points to the patron for a collect and redeem program.

6. The improved promotional financial transaction machine method of claim 1, wherein said promotional receipt further includes a financial section, reporting financial details of the patron's transaction.

7. The improved promotional financial transaction machine method of claim 1, wherein said determining step and said performing step are performed by a promotion controller processor installed at an individual financial transaction machine location.

8. The improved promotional financial transaction machine method of claim 1, wherein said determining step and said performing step are performed by a promotion controller processor installed at a central financial transaction machine host terminal driver system.

9. The improved promotional financial transaction machine method of claim 8, wherein said promotion controller processor is coupled to a terminal handler portion of the central financial transaction machine host terminal driver system.

10. The improved promotional financial transaction machine method of claim 1, wherein said patron's specific transaction type qualifies for the promotional offer if the patron utilizes a participating financial transaction machine to conduct a transaction at a predetermined time.

11. The improved promotional financial transaction machine method of claim 10, wherein said predetermined time is a specific date.

12. The improved promotional financial transaction machine method of claim 10, wherein said predetermined time is a specific time of day.

13. The improved promotional financial transaction machine method of claim 1, wherein said patron's specific transaction type qualifies for a promotional offer if the transaction included the purchasing of a particular product.

14. The improved promotional financial transaction machine method of claim 13, wherein said particular product is an alternate media transaction product.

15. The improved promotional financial transaction machine method of claim 13, wherein said particular product is a predetermined amount of an alternate media transaction product.

16. The improved promotional financial transaction machine method of claim 1, wherein said patron's specific transaction type qualifies for a promotional offer if the transaction included the withdrawal of at least a predetermined minimum amount of money.

17. The improved promotional financial transaction machine method of claim 1, wherein said patron's specific transaction type qualifies for a promotional offer if the transaction included the use of a card from a predetermined institution.

* * * * *